United States Patent [19]

Yamashita et al.

[11] 4,279,004
[45] Jul. 14, 1981

[54] METHOD FOR CONTROLLING ROTARY MEMORY DEVICE

[75] Inventors: Yoshiaki Yamashita; Hiroyuki Kambara, both of Hadano; Hiroaki Kambayashi; Yasuyuki Okada, both of Sagamihara, all of Japan

[73] Assignee: Hitachi, Ltd., Tokyo, Japan

[21] Appl. No.: 35,530

[22] Filed: May 3, 1979

[30] Foreign Application Priority Data

Oct. 4, 1978 [JP] Japan .................... 53-121541

[51] Int. Cl.³ ............................................. G11B 5/09
[52] U.S. Cl. ...................................... 360/48; 360/49; 360/72.2
[58] Field of Search .................. 360/48, 49, 50, 72

[56] References Cited

U.S. PATENT DOCUMENTS

| | | | |
|---|---|---|---|
| 3,623,039 | 11/1971 | Barham | 360/49 |
| 3,656,130 | 4/1972 | Bucklin, Jr. et al. | 360/48 |
| 3,701,130 | 10/1972 | Ault | 360/49 |
| 3,787,815 | 1/1974 | Farr, Jr. | 360/48 |
| 3,986,208 | 10/1976 | Sykes | 360/49 |
| 4,126,887 | 11/1978 | Miyazaki et al. | 360/48 |

*Primary Examiner*—Vincent P. Canney
*Attorney, Agent, or Firm*—Craig and Antonelli

[57] ABSTRACT

Disclosed is a method for controlling a rotary memory device for recording information on a recording medium in the form of a track, in which method the respective areas, such as a count section, a key section and a data section, which constitute a record format in the form of a record, are stored in the respective sectors each having a fixed length.

3 Claims, 4 Drawing Figures

METHOD FOR CONTROLLING ROTARY MEMORY DEVICE

BACKGROUND OF THE INVENTION

1. Field of the Invention

This invention relates to a method for controlling a rotary memory device such as a magnetic disk memory for storing a record unit including an address section and a data section on a recording medium in the form of a track.

2. Description of the Prior Art

In a magnetic disk device such as used in a general purpose computor system, a fixed address for physically specifying a one-to-one correspondence, which is used in a main memory device, is not provided, but an address section (hereafter referred to as a count section) is provided for the identification of the information to be stored. Moreover, the length of a unit piece of information to be recorded (hereafter referred to simply as "the record") is variable and a specific flag called an address marker is attached to the head of a record so as to identify the beginning of the record.

The widely used method of writing an address marker at the top of a record is to erase a portion of the recording medium by a direct current. This method is different from that for the writing of information and therefore a special circuit should be provided for the writing of the address markers. Further, the identification of address markers also needs a circuit different from that required for the reading of information. Thus, these additional requirements lead to an increase in the complexity of the overall apparatus.

Moreover, since the identification of a record depends only upon the associated address marker, the hardware must be more complicated to assure the exact access to the beginning of information.

SUMMARY OF THE INVENTION

An object of this invention is to obviate the above-discussed drawbacks and to provide a method which enables a magnetic recording and reproducing system to eliminate resorting to a specific identifier such as an address marker the writing and identification of which require a specific circuit.

According to this invention, a track is divided into plural regions having a fixed length (hereafter each region is referred to as a sector) and a signal or a sector pulse for indicating the beginning of each sector is generated when the beginning of the sector is reached. The signal may be detected by using a specific track provided only for the signal. When a record including at least an address section and a data section is stored, the address section is stored in a sector together with a piece of information (hereafter referred to as a flag) for distinguishing the stored address section from other information while the data section is stored in another sector posterior to the sector in which the address section is stored. The access to a record proceeds in such a manner as follows: First, the beginning of a sector is detected and then the associated flag is searched. When the flag is detected, the address section which follows the flag is read and the read-out address section is compared with the address information supplied externally. If there is a coincidence between the address section and the externally provided address information, the access to the data section stored in the posterior sector is made.

In the case where the address information supplied externally includes a track address, a particular track address may be stored in at least one of the sectors of each track independently of the address section. According to that scheme, the accuracy of location of the head, after the head positioning operation, can be checked by comparing the track address read out of the associated sector with the track address included in an externally supplied address information.

Moreover, each sector may store a piece of information representing the number attached to the sector in the area anterior to the area in which the address section of a record is to be stored (hereafter this piece of sector number information is referred to as a sector number).

In that case, by reading out the sector number of a desired sector when an access is made to the desired sector, the desired sector can be searched on the basis of the read-out sector number.

DESCRIPTION OF THE PREFERRED EMBODIMENTS

Figure 1:
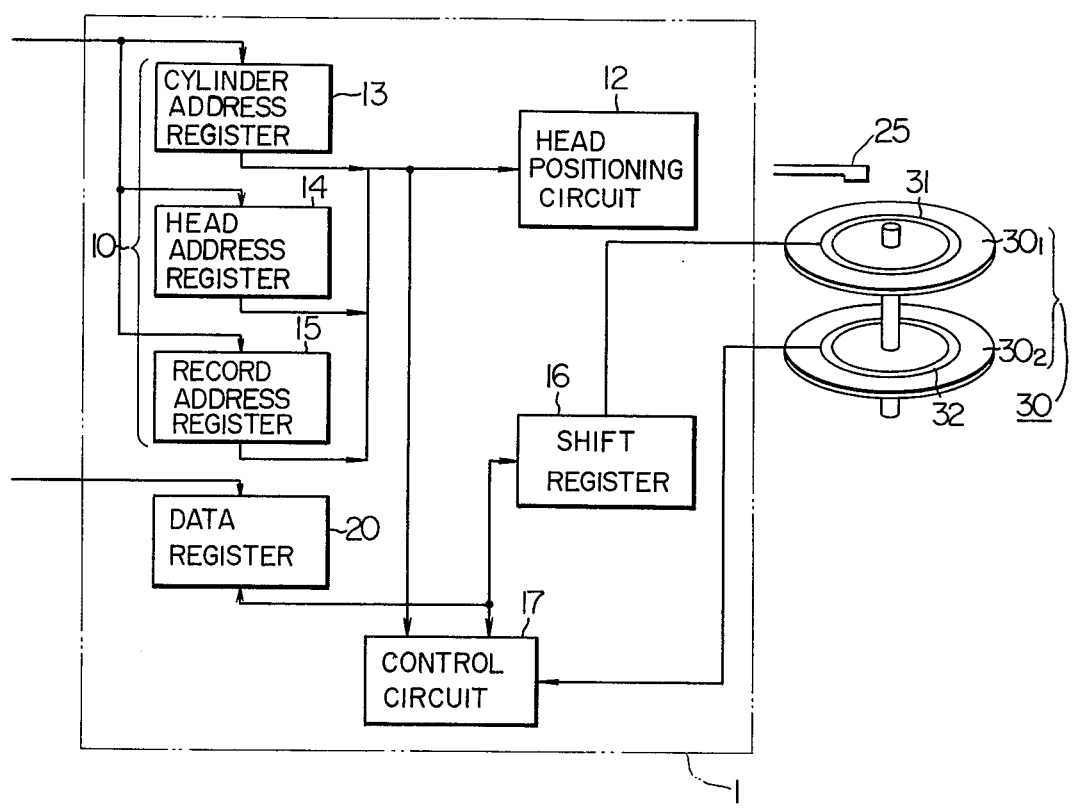
FIG. 1 shows in block diagram a magnetic disk apparatus as an embodiment of this invention.

Now, preferred embodiments of this invention will be described. In FIG. 1 showing in block diagram a magnetic disk apparatus according to this invention, reference numeral 30 designates magnetic disks rotated by a mechanical power source not shown. A track 31 on a disk $30_1$ is called a data track and serves to store information therein. The data track 31 is divided into plural sectors each being the same and of fixed length. A track 32 on a disk $30_2$ is called a servo track and serves to store pieces of information, representing the beginning points of the respective sectors of the data track 31. Only one servo track 32 is required even in the case where more than two magnetic disks $30_1$ are used. It should here be noted that though only a single track is shown as provided on each magnetic disk, each disk may actually contain a multiplicity of concentric tracks. The other function of the circuit of FIG. 1 will be described later in detail.

Figure 2:
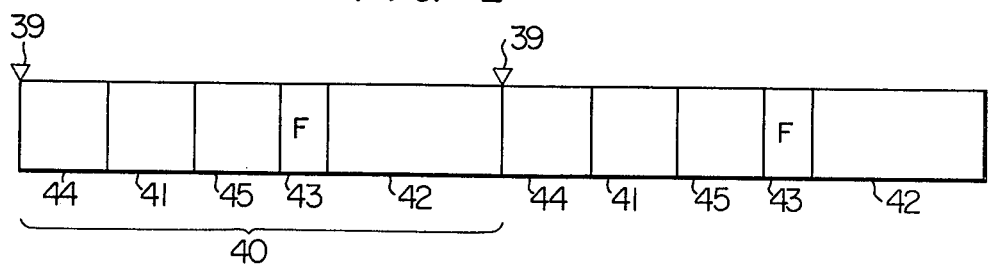
FIG. 2 shows in detail the constitution of sectors in a data track.

FIG. 2 illustrates the constitution of the information to be stored in a data track 31 as shown in FIG. 1. In FIG. 2, reference numeral 39 indicates the beginning point of each sector and the region between such two points 39 forms a sector 40. Each point 39 is detected by a sector pulse produced from the servo track 32. Numeral 41 designates an information area which serves to store the physical address of the sector in which this information area is contained; 42 another information area which serves to store a record specified by the software; 43 a flag which is used to identify the record information area 42; 44 a buffer gap provided between adjacent sectors; and 45 a gap for separating the record information area 42 from the physical address area 41. Every area 41 has the same and fixed length and the same is true for every area 42, every flag 43, every gap 44 and every gap 45. Accordingly, in every sector 40, when read out, the physical address area 41, the flag 43 and the record information area 42 always appear at the same fixed locations with respect to the position at which the sector pulse 39 is detected.

According to this invention, the conventional record having a variable length is recorded and reproduced after it has been transformed into a fixed-length format as shown in FIG. 2.

Figure 3:
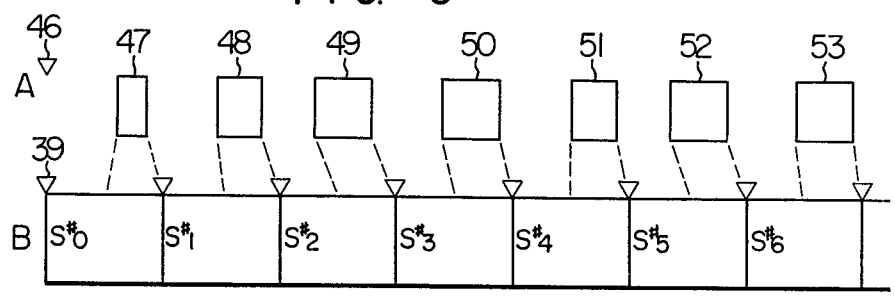
FIG. 3 illustrates the format of a record having a variable length and the format in which the data having the variable-length format is stored according to this invention.

FIG. 3A shows the constitution of the format of a record having a variable length. In the track A of FIG. 3, a reference numeral 46 indicates the beginning point of the data track and this point 46 is detected by an index marker; numeral 47 a home address section representing the address of the data track; 48 the count section of the first record (referred to as "record O") on the track; 49 the key section of the record O; 50 the data section of the record O; 51 the count section of the second record (referred to as "record 1"); 52 the key section of the record 1; 53 the data section of the record 1; and so on.

According to this invention, the record information as shown in the track A of FIG. 3 is stored in the format shown in FIG. 2. Namely, as shown in FIG. 3, the home address 47 of the track A is necessarily written in the record information area 42 in a sector S#O. The home address 47 represents not only the track address but also the information about the state of the track in question, and is used to check whether or not the head is correctly positioned on the track and whether or not a proper track is chosen, and to start the reproducing operation correctly at the beginning of the track.

The respective sections of the record O and the posterior records are stored sequentially in the successive sectors. Namely, the count section 48 of the record O is stored in the record information area 42 of the sector S#1, the key section 49 of the record O is stored in the record information area 42 of the sector S#2, the data section 50 of the record O is stored in the record information area 42 of the sector S#3, and so on. If the data section 50 is so long, the information area of a single sector may not accommodate all of the information of the data section 50. In such a case, the excess portion of the data section 50 is stored in the record information area 42 of the next following sector. Thus, the data section 50 may be stored in more than two successive sectors. The flags 43 in the respective sectors are represented in the hexadecimal coding, i.e. $(26)_{16}$ for the sectors storing the count sections and $(OE)_{16}$ for the other sectors. In the track B of FIG. 3, the gaps, which are inserted in the actual track, are omitted for brevity and therefore not shown.

Figure 4:
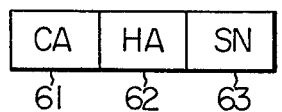
FIG. 4 shows in detail a physical address area shown in FIG. 2.

FIG. 4 shows the constitution of the information stored in the physical address area 41. In FIG. 4, reference numeral 61 designates the cylinder address of the data track in question, 62 the head address of the same data track, and 63 the sector number of the sector in question of the data track. Every cylinder address 61 and every head address 62 respectively remain the same in all the sectors of a data track while the sector numbers 63 are incremented for successive sectors.

The apparatus shown in FIG. 1 performs a recording and reproducing operation in the format B as shown in FIG. 3, in such a manner as follows:

The write/read operation will first be described. Apparatus in the upper stream, e.g. channel apparatus, supplies a writing information and an address information to a control apparatus 1 when the writing operation is performed while the channel apparatus supplies only an address information to the control apparatus 1 in the case of a reading operation. The writing information is stored in a data register 20 and the address information is stored in the group 10 of address registers 13, 14 and 15.

The cylinder address, the head address and the record address of the address information are set in the cylinder address register 13, the head address register 14 and the record address register 15, respectively. A head positioning circuit 12 serves to position a magnetic head 25 properly on a desired data track. The head positioning circuit 12 causes the magnetic head to be shifted by receiving the contents of the cylinder address register 13 and the head address register 14.

After this positioning operation, the information in the physical address area 41 just after the beginning point 39 of the sector is read out and the cylinder address 61 of the information is read in a bit-serial fashion so that the cylinder address 61 bit-serially read is set in a shift register 16. The content of the shift register 16 and the content of the cylinder address register 13 are sent to a control circuit 17 which compares one content with the other.

If there is a coincidence between those contents, the head address 62 in the physical address area 41 is bit-serially read out and set in the shift register 16.

Then, the contents of the shift register 16 and the head address register 14 are received as inputs by the control circuit 17 which in turn compares the respective contents with each other. If there is a coincidence between the contents, it means that the magnetic head is properly positioned on a desired data track.

Incidentally, the magnetic head passes by some sectors in the write/read operation and whether or not the positioning of the magnetic head is proper, may be checked through the same operation as described above by always reading out the contents of the physical address areas 41 of the respective sectors passed by.

After it is determined that the magnetic head is positioned properly on the desired data track, the flag 43 is read out and set in the shift register 16. The control circuit 17 checks whether the content of the shift register 16 is $(26)_{16}$ or not, and unless it equals $(26)_{16}$, the flag 43 of the next sector is not detected. Similar operations are repeated until the content of the shift register 16 is found equal to $(26)_{16}$. When the requirement is satisfied, the count section of the record information area 42 following the flag 43 is bit-serially read out and set in the shift register 16. Then, the content of the shift register 16 and the cylinder address, the head address and the record address set in the address register group 10 are successively received by the control circuit 17 which in turn compares these addresses with those of the content of the shift register 16. If there is a coincidence between each of the sets of the corresponding addresses, the control circuit 17 writes in or reads out the key section in the record information area 42 of the next sector and further the data section stored in the record information area 42 of the second next sector. The information to be written in the data section is supplied from the data register 20 and the information read out of the data section is set in the data register 20.

The sector number 63 in the physical address area 41 is used as follows: The count section specifies the byte lengths of the key section and the data section of the associated record and if the length of each of the gap 44, the physical address area 41, the gap 45 and the flag 43 is fixed, it is possible by reading out the count section to calculate the distance to the count section of the next record in terms of the number of bytes. Accordingly, the control circuit 17 can obtain the sector number of a sector storing the next count section on the basis of the sector number of the previous sector storing the immediately previous count section. In this way, reliability in retrieving information can be much more improved by using both the flag 43 and the sector number 63 than by using only the flag 43 having a value of $(26)_{16}$.

As described above, according to this invention, since the count section, the key section and the data section of a record stored in successive sectors can be respectively read out at fixed positions with respect to the beginning of the first one of the sectors storing the record, markers which are used in the conventional apparatus and need the provision of a special processing circuit having a complicated configuration, may be eliminated.

Therefore, the apparatus as a whole can be simplified.

What is claimed is:

1. A method for controlling a rotary memory apparatus for storing at least one record including at least an address section identifying the record and a data section forming the data of the record, in a recording medium along a track, said method comprising the steps of:

dividing the track into a plurality of sectors each being of the same fixed length;

storing the address section of a given record in one of the sectors together with a flag for distinguishing the stored address section from other types of sections in other sectors;

storing the data section for a given record in at least one of the sectors succeeding the sector in which the address section is stored;

searching for said flag in succeeding sectors, in the operation of seeking access to the stored data section, after the detection of the beginning point of each sector;

reading out the address section which follows the flag, upon the detection of the flag;

comparing the read-out address section with externally supplied address information; and making an access to the data section stored in the succeeding sector, upon the detection of coincidence between the read-out address section and the address information as a result of said comparison.

2. A control method as claimed in claim 1, wherein in the case where said externally applied address information includes a track address, a specific track address for identifying the track is stored in at least one of the sectors of the track and after the positioning of a head to make access to the information stored on the track, the stored track address is read out of the sector in which the track address is stored so that the read-out track address is compared with the track address included in the externally supplied address information so as to check the coincidence therebetween.

3. A control method as claimed in claim 1, wherein each of the sectors stores therein information including sector number information representing the sector in which the sector number information is stored, and wherein when an access is made to a desired one of the sectors, the particular sector number of the desired sector is read out so as to enable the desired sector to be searched on the basis of the read-out sector number.

* * * * *